(12) United States Patent
Terry

(10) Patent No.: US 9,331,609 B1
(45) Date of Patent: May 3, 2016

(54) ELECTRICAL MOTORS AND METHODS THEREOF HAVING REDUCED ELECTROMAGNETIC EMISSIONS

(71) Applicant: Rossie Owen Terry, Michigan City, IN (US)

(72) Inventor: Rossie Owen Terry, Michigan City, IN (US)

( * ) Notice: Subject to any disclaimer, the term of this patent is extended or adjusted under 35 U.S.C. 154(b) by 0 days.

(21) Appl. No.: 14/973,475

(22) Filed: Dec. 17, 2015

Related U.S. Application Data

(63) Continuation-in-part of application No. 14/511,534, filed on Oct. 10, 2014, now abandoned.

(60) Provisional application No. 61/896,745, filed on Oct. 29, 2013.

(51) Int. Cl.
| | |
|---|---|
| *H02P 1/00* | (2006.01) |
| *H02P 3/08* | (2006.01) |
| *H02K 5/22* | (2006.01) |
| *H02K 11/02* | (2016.01) |
| *H02K 11/00* | (2016.01) |

(52) U.S. Cl.
CPC ............ *H02P 3/08* (2013.01); *H02K 5/225* (2013.01); *H02K 11/001* (2013.01); *H02K 11/02* (2013.01)

(58) Field of Classification Search
CPC .................... H02K 11/0073; G06F 3/0634
See application file for complete search history.

(56) References Cited

U.S. PATENT DOCUMENTS

2002/0144057 A1* 10/2002 Li ..................... G06F 3/0614
                                                  711/112

* cited by examiner

*Primary Examiner* — Karen Masih
(74) *Attorney, Agent, or Firm* — Hartman Global IP Law; Gary M. Hartman; Michael D. Winter

(57) ABSTRACT

Motors and method of operation thereof operable in a running mode wherein the motor operates at a constant speed, and operable in a park mode wherein the motor is dynamically parked. The motor is housed within a housing and includes a rotating park disk configured to cause the motor to dynamically park. A park wire electrically couples the park disk to a switch configured to selectively switch the motor between the running mode and the park mode, and a power wire electrically couples the park disk to a power source. The park disk is electrically isolated from the power source during operation of the motor in the running mode and the park wire is electrically connected to the power source through the park disk and the power wire during operation of the motor in the park mode.

21 Claims, 16 Drawing Sheets

HIGH SPEED PARK WIRE SIGNAL 1
SIGNAL DEVELOPED BY STOCK MOTOR

MOTOR ON HIGH, PARK WIRE SIGNAL
SIGNAL DEVELOPED USING INVENTION

ELECTRICAL MOTORS AND METHODS
THEREOF HAVING REDUCED
ELECTROMAGNETIC EMISSIONS

CROSS REFERENCE TO RELATED
APPLICATIONS

This is a continuation-in-part patent application of co-pending U.S. patent application Ser. No. 14/511,534, filed Oct. 10, 2014, which claims the benefit of U.S. Provisional Application No. 61/986,745, filed Nov. 19, 2013. The contents of these prior applications are incorporated herein by reference.

BACKGROUND OF THE INVENTION

The present invention generally relates to electric motors. More particularly, this invention relates to electric motors of types that are adapted to drive windshield wipers and incorporate a dynamic park capability.

The motor vehicle industry utilizes electric motors to drive windshield wipers. In general, a windshield wiper system having a dynamic park function comprises a motor, a rotary-to-linear motion converter mechanism, windshield wipers, a switch for controlling the motor, and a park disk. An exemplary 24 volt direct current (DC) windshield wiper motor 10 as known in the art is represented in FIG. 1.

As conventional in the art, the motor 10 may be controlled, for example, with a manual selector switch 17 (FIGS. 10-12), to be operable in any one of three possible modes of operation: park, high speed, and low speed. The motor 10 incorporates a park disk 12 for what is known and referred to as dynamic parking which is a process of returning the windshield wipers to their original starting or 'park' positions when the motor 10 is turned off with the switch 17. The park disk 12 is rotatably mounted within a gear head 13, rotates as a result of engaging a worm gear 15 driven by a rotor (not shown) within an electric motor housing 11 of the motor 10, and drives a rotary-to-linear motion converter mechanism functionally coupled to a windshield wiper (not shown). The park disk 12 is a circular disk-shaped component that includes a ground tab 14, park section 16, and battery positive section 18. FIG. 2 represents an interior portion of a gear housing plate 20 that is configured to be assembled to the gear head 13 for interaction with the park disk 12 of FIG. 1. The gear housing plate 20 has ground, park, and battery positive contacts 22, 24 and 26, respectively, which interact with the ground tab 14, park section 16, and battery positive section 18, respectively, of the park disk 12 as the park disk 12 rotates. FIG. 3A represents a diagram of the park disk 12 as assembled with three armatures corresponding to the ground, park, and battery positive contacts 22, 24 and 26. FIG. 10 is a wiring diagram representing a system and method of wiring the park disk 12 to the switch 17 and a battery 13. As represented, a positive terminal ('+') of the battery 13 is connected to the switch 17 and a negative terminal ('−') of the battery 13 is connected directly to a contact 21 on the motor 10. The high input wire 52, low input wire 50, and park wire 54 connect the switch 17 to contacts 21 on the motor 10. The switch 17 is connected by a battery positive wire 52 to the battery positive contact 26 at the park disk 12. In FIG. 10, the switch 17 is set to the park position ('off') thereby electrically connecting the park wire 54 to the low input wire 50. In the figures, the position of the switch 17 is depicted by a solid arrow. The motor 10 is represented as being turned off and the park disk 12 is located in the park position.

During operation, when the manual selector switch 17 (motor switch) is set to a low or high position ('low' or 'high'), the motor 10 operates in low or high speed mode, respectively. Operation of the motor 10 consequently rotates the park disk 12 and, through the rotary-to-linear motion converter mechanism, moves the windshield wipers back and forth across the windshield both at low or high speed depending on the mode of operation of the motor 10. While the motor 10 is running in low or high speed modes, the park disk 12 continuously rotates, with each full rotation corresponding to one complete swipe (across the windshield and back to the park position) of the windshield wipers.

FIG. 11 represents the wiring diagram of FIG. 10 when the switch 17 is set to the low position ('low') thereby connecting the low input wire 50 to the positive terminal on the battery 13, and the motor 10 is operating in low speed mode. Current flows from a positive terminal on a battery 13 to the switch 17, through the switch 17 to a low input wire 50, through the low input wire 50 to the motor 10 (via contact 21), through the motor 10 to a battery negative wire 56 (via contact 21), and through the battery negative wire 56 to the negative terminal on the battery 13 (or ground). During this time, the high input wire 52 and the park wire 54 are open at the switch. The park disk 12 is represented as being in an exemplary transient operating position. It should be understood that the system operates in substantially the same manner when in high speed mode rather than low speed mode. When the switch 17 is set to the high position ('high'), the high input wire 52 is connected to the positive terminal on the battery 13, and the low input wire 50 and park wire 54 remain open.

If the switch is moved to the park position ('off') while the motor 10 is operating in low or high speed mode, the park disk 12 enters the park mode and continues to rotate, for example, through the transient position shown in FIG. 3A, until it reaches a predetermined park position, represented in FIG. 3B. FIG. 12 represents the wiring diagram of FIG. 11 when the switch is set from the low position ('low') to the park position ('off') and the motor 10 is operating in park mode. The switch 17 connects the park wire 54 and the low input wire 50 such that current flows from the positive terminal on the battery 13 to the switch 17, through the switch 17 to a battery positive wire 58, through the battery positive wire 58 to the park disk 12 (via the contact 21 and the battery positive contact 26), through the park disk 12 to a park wire 54 (via the park contact 24), through the park wire 54 to the switch 17, through the switch 17 to the low input wire 50, through the low input wire 50 to the motor 10 (via contact 21), through the motor 10 to the battery negative wire 56 (via contact 21), and through the battery negative wire 56 to the negative terminal on the battery 13 (or ground). During this time, the low input wire 50 and the high input wire 52 are not directly connected to the positive terminal of the battery 13 within the switch 17, rather power is provided through the park wire 54. If the park disk 12 is in a transient operating position, as represented in FIG. 12, the motor will continue to operate at low speed and until the park disk rotates to the park position, represented in FIGS. 3B and 10.

As represented in FIG. 3B, the park position of the motor 10 is reached when the battery positive contact 26 is suspended over an opening 19 in the park disk 12 and therefore is not electrically connected to the battery positive section 18, the park contact 24 is electrically connected to the park section 16, and the ground contact 22 is electrically connected to the ground tab 14. Once the park disk 12 reaches the park position, the circuit represented in FIG. 12 is opened as a result of the battery positive contact 26 no longer being in contact with the battery positive section 18 and the motor 10 functions as a load generator developing a torque that rapidly stops the motor 10 and thereby stops the windshield wipers in their park position. The dynamic park function ensures that the windshield wipers will always return to their park position regardless of their current position when the switch 17 is turned to 'off.'

In normal operation of the motor 10 in either high or low speed modes, the park disk 12 continuously rotates and makes contact to both +24 volts (i.e., battery positive contact 26 electrically connected battery positive section 18) and ground (i.e., ground contact 22 electrically connected to ground tab 14) once during each revolution of the park disk 12 thereby sequentially creating a negative pulse and a positive pulse of conducted and radiated electromagnetic emissions. On dynamic park motors such as the windshield wiper motor 10 of FIG. 1, these pulses occur when the voltage goes from +24 volts to ground (0 volts) and then back to +24 volts. For example, FIG. 4A represents a measurement of pulses taken from a conventional dynamic park motor, such as the motor 10 of FIG. 1, as the park disk 12 rotates. These pulses may travel through wires exiting the motor 10, for example, high input wire 52, low input wire 50, park wire 54, battery positive wire 58, and battery negative wire 56, and radiate therefrom causing electro-magnetic interference (EMI) during each revolution of the park disk 12.

Increasingly, electronic devices are installed in or used around motor vehicles which are sensitive to the EMI generated by electric motors. In certain cases, EMI can pose a security risk. For example, the EMI generated by the windshield wiper motor 10 of FIG. 1 can be detected and traced to a military vehicle in which the motor 10 is installed, indicated by a repeating signal on radar which reveals the location and direction of the vehicle. Such military vehicles must meet strict government EMI control regulations, such as U.S. military standard MIL-STD-461F. Consequently, there is a need for systems and methods suitable for reducing or eliminating this pulse of electromagnetic emissions.

BRIEF DESCRIPTION OF THE INVENTION

The present invention provides electrical motors and methods of operation thereof suitable for reducing or eliminating a pulse of electromagnetic emissions produced by the electric motors.

According to a first aspect of the invention, an electrical motor is operable in at least one running mode wherein the electrical motor operates at a constant speed, and is operable in a park mode wherein the electrical motor is dynamically parked. The electrical motor is housed within a housing and includes a rotating park disk configured to cause the electrical motor to dynamically park. A park wire electrically couples the park disk to a motor switch. The motor switch is configured to selectively switch the electrical motor between the at least one running mode and the park mode, and a power wire electrically couples the park disk to a power source. Portions of the park wire and the power wire exit the housing of the electrical motor so as to be disposed externally of the housing. The park disk is electrically isolated from the power source during operation of the electrical motor in the at least one running mode and the park wire is electrically connected to the power source through the park disk and the power wire during operation of the electrical motor in the park mode. The park wire provides power to the electrical motor in the park mode such that the electrical motor dynamically parks.

According to a second aspect of the invention, an electrical motor is operable in at least one running mode wherein the electrical motor operates at a constant speed, and is operable in a park mode wherein the electrical motor is dynamically parked. The electrical motor is housed within a housing and includes a rotating park disk functionally coupled to a ground contact, a park contact, and a battery positive contact. The park disk is configured to cause the electrical motor to dynamically park by operating the electrical motor in the at least one running mode until the park disk rotates to a park position such that the park disk is electrically coupled to the ground contact and the park contact and not electrically coupled to the battery positive contact. A park wire electrically couples the park contact to a motor switch configured to selectively switch the electrical motor between the at least one running mode and the park mode, and a battery positive wire electrically couples the battery positive contact to a positive terminal on a battery. Portions of the park wire and the battery positive wire exit the housing of the electrical motor so as to be disposed externally of the housing. The park disk is electrically isolated from the power source during operation of the electrical motor in the at least one running mode and the park wire is electrically connected to the power source through the park disk and the battery positive wire during operation of the electrical motor in the park mode until the park disk rotates to a park position, the park wire providing power to the electrical motor in the park mode such that the electrical motor dynamically parks.

According to a third aspect of the invention, a method of operating an electrical motor that is operable in at least one running mode wherein the electrical motor operates at a constant speed and that is operable in a park mode wherein the electrical motor is dynamically parked. The electrical motor is housed in a housing and includes a rotating park disk configured to cause the electrical motor to dynamically park. A park wire electrically couples the park disk to a motor switch configured to selectively switch the electrical motor between the at least one running mode and the park mode, and a power wire electrically couples the park disk to a power source. Portions of the park wire and the power wire exit the housing of the electrical motor so as to be disposed externally of the housing. The method includes electrically isolating the park disk from the power source during operation of the electrical motor in the at least one running mode, and electrically connecting the park wire to the power source through the park disk and the power wire during operation of the electrical motor in the park mode.

A technical effect of the invention is the ability to greatly reduce or eliminate EMI produced by electric motors, for example, an electric motor operating to drive windshield wipers having a park disk. Specifically, by electrically isolating the power wire from the park disk during operation of the motor in a running mode, electromagnetic emissions may be, and preferably are, reduced, captured, and suppressed before the emissions can conduct through and radiate from wires which are exposed to an exterior of the motor. Electromagnet emissions can potentially be reduced to an extent capable of protecting electronic devices that might otherwise be sensitive to EMI, and/or avoid detection and tracing of the motor or a vehicle in which the motor is installed.

Other aspects and advantages of this invention will be better appreciated from the following detailed description.

BRIEF DESCRIPTION OF THE DRAWINGS

FIGS. 3A and 3B are diagrams representing a park disk of an electric motor and corresponding ground, park, and battery positive contacts of the types depicted in FIGS. 1 and 2, wherein FIG. 3A represents the park disk in a transient operating position, and FIG. 3B represents the park disk in a park position.

FIG. 10 represents the switch in the park position and the park disk in the park position. FIG. 11 represents the switch in the low position and the motor operating in low speed mode. FIG. 12 represents the switch in the park position and the motor operating in park mode.

FIG. 13 represents the switch in the park position and the park disk in the park position. FIG. 14 represents the switch in the low position and the motor operating in low speed mode. FIG. 15 represents the switch in the park position and the motor operating in park mode.

DETAILED DESCRIPTION OF THE INVENTION

Figure 4A:
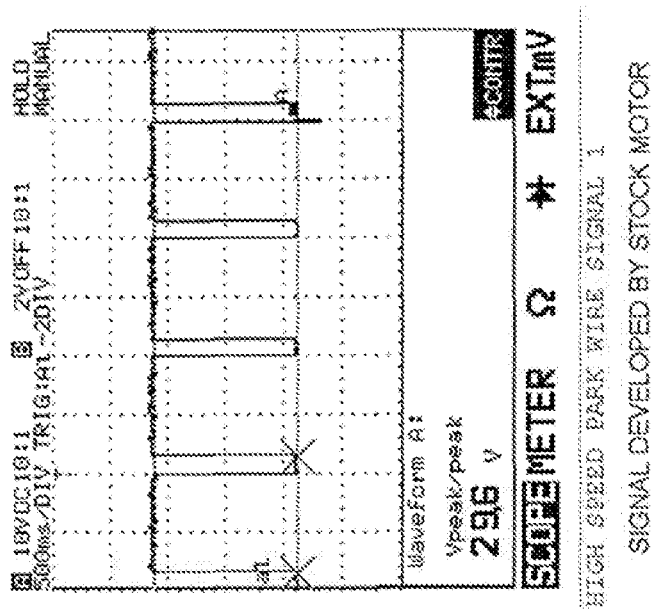
FIGS. 4A and 4B are graphs representing measurements of electromagnetic emissions from, respectively, a conventional electrical motor of a type known in the art and an electrical motor in accordance with an aspect of the invention.
Figure 4B:
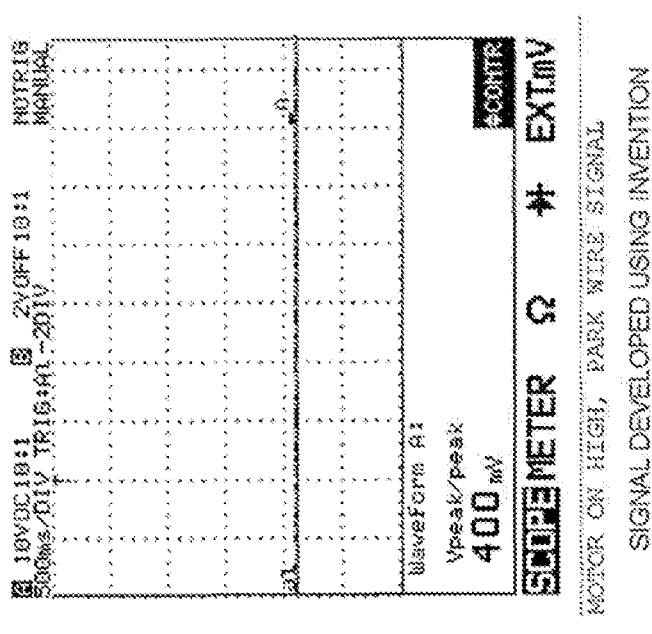

The present invention relates to systems and methods suitable for reducing or eliminating electromagnetic emissions produced by an electric motor, particular but nonlimiting examples of which include dynamic park electric motors used for driving windshield wipers on motor vehicles. The systems described hereinafter reduce the electromagnetic emissions produced by the electric motors during operation in a running mode by isolating a power wire from the park disk with a relay or a functional equivalent thereof. The emissions are captured and suppressed before they can conduct through and radiate from the wires to the motor switch and the surrounding environment, as represented in FIG. 4B. These systems may be installed during manufacture of the motors or may be installed on motors after manufacture, and provide reduced electromagnetic emissions within industry standards, such as the U.S. military standard MIL-STD-461F. The systems can suppress the emissions with a circuit of components wired directly into a motor's electrical system, and preferably (though not required) installed externally to the motor without altering or changing any physical characteristics of the motor. This promotes a cost effective solution on electric motors where EMI suppression is needed, a notable but nonlimiting example of which is military vehicles. In the drawings, identical reference numerals denote the same or functionally equivalent elements throughout the various views.

Figure 1:
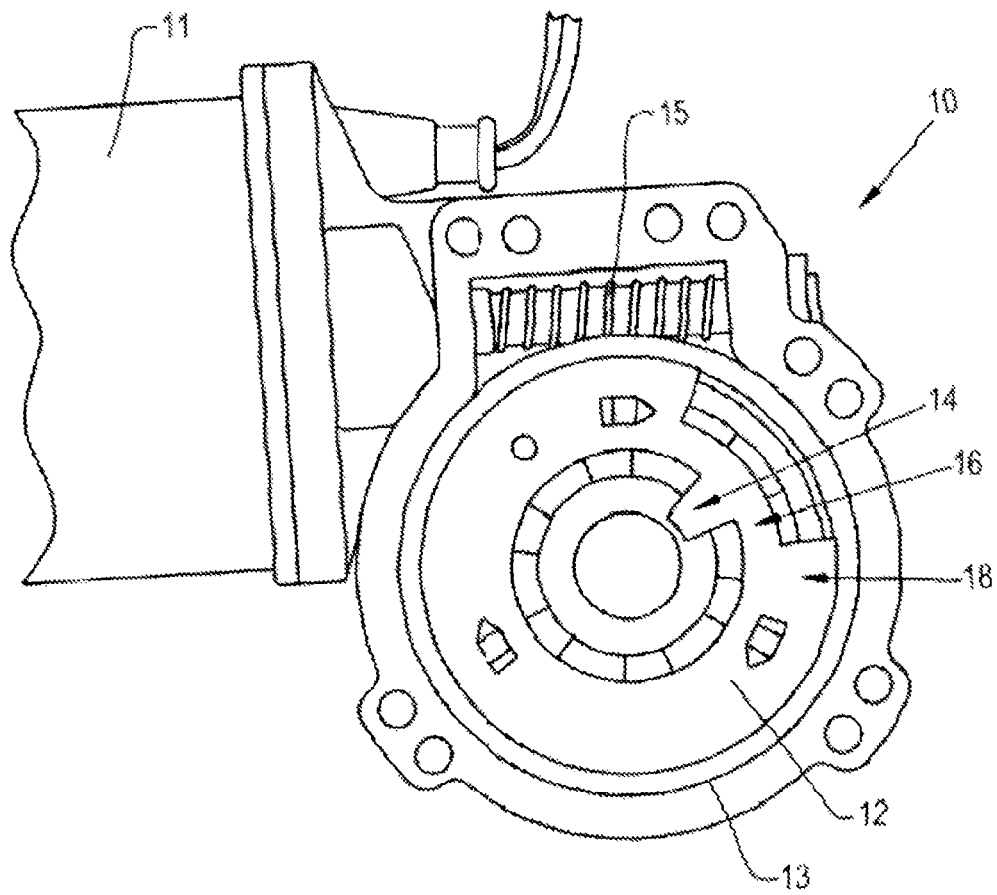
FIG. 1 represents a windshield wiper motor of a type known in the art wherein the motor is shown partially disassembled to expose a park disk for illustrative purposes.
Figure 2:
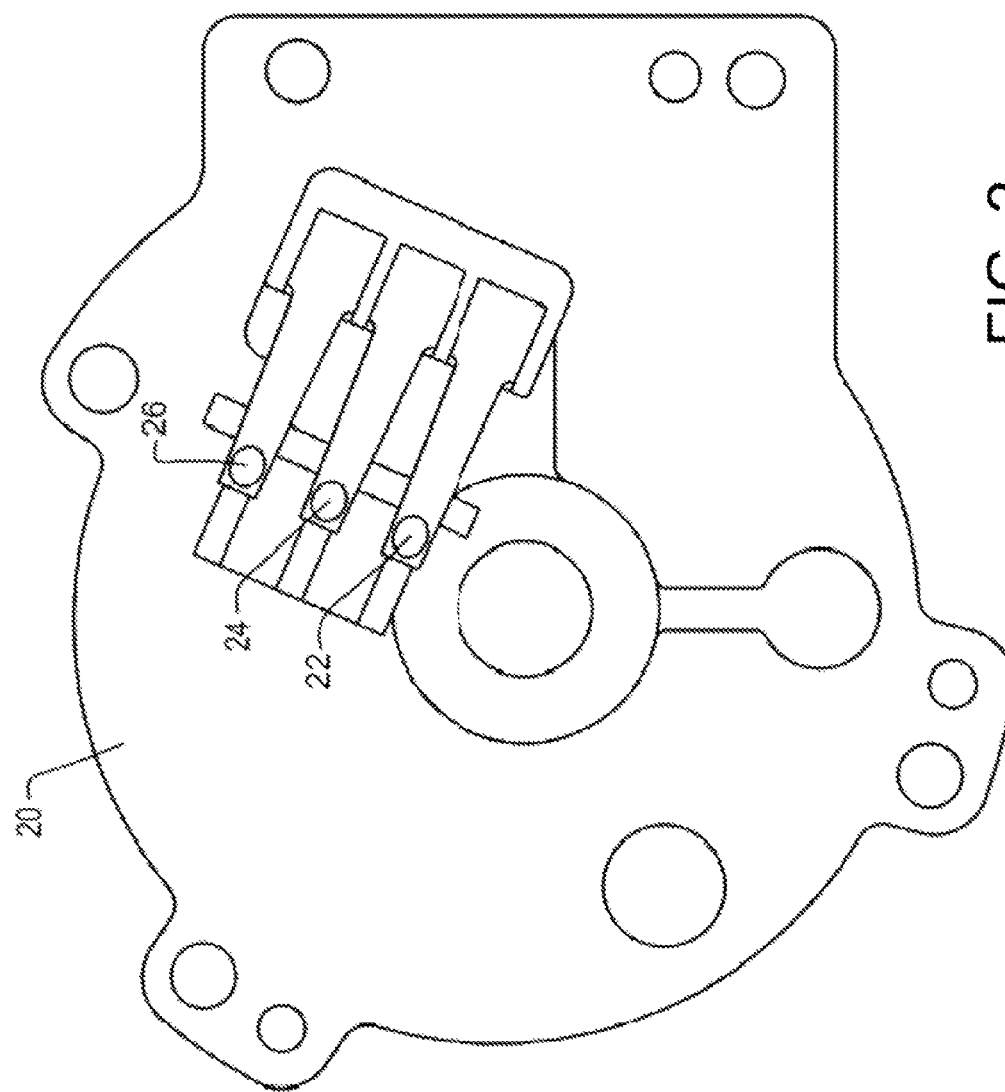
FIG. 2 represents an interior portion of a gear housing plate having ground, park, and battery positive contacts adapted for interaction with the park disk of FIG. 1.
Figure 5:
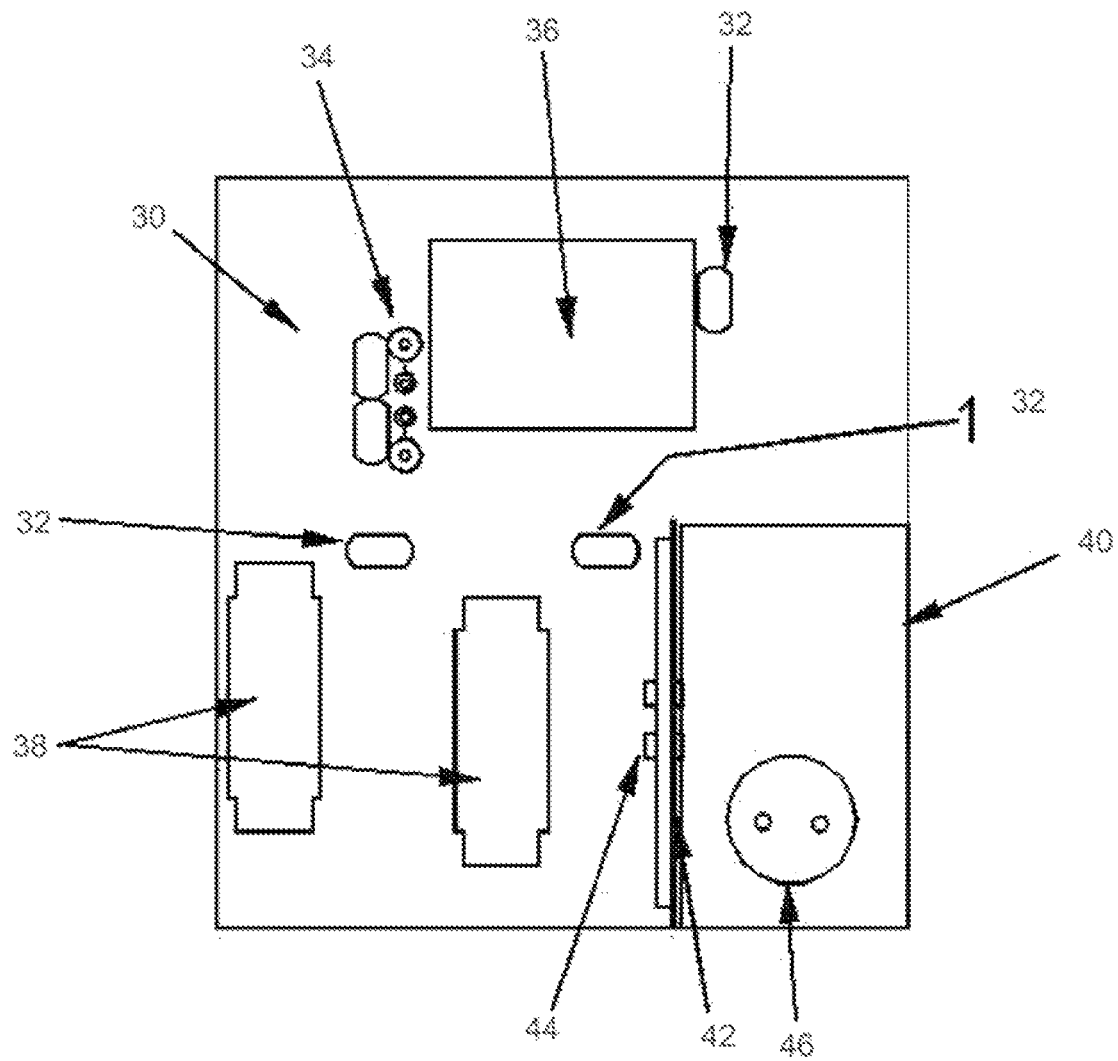
FIG. 5 represents a printed circuit board having components thereon suitable for suppressing EMI produced from an electrical motor in accordance with an aspect of the invention.
Figure 6:
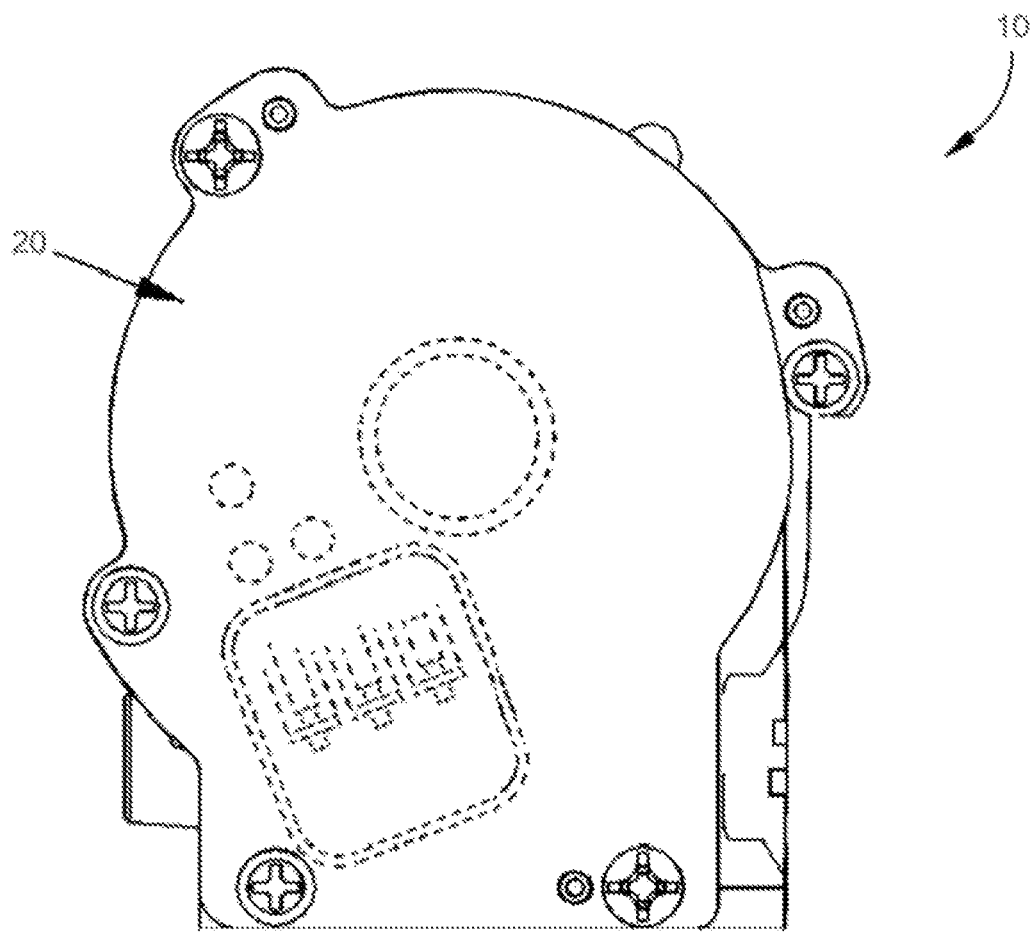
FIG. 6 represents an exterior portion of a gear housing plate of an electrical motor of a type known in the art.
Figure 7:
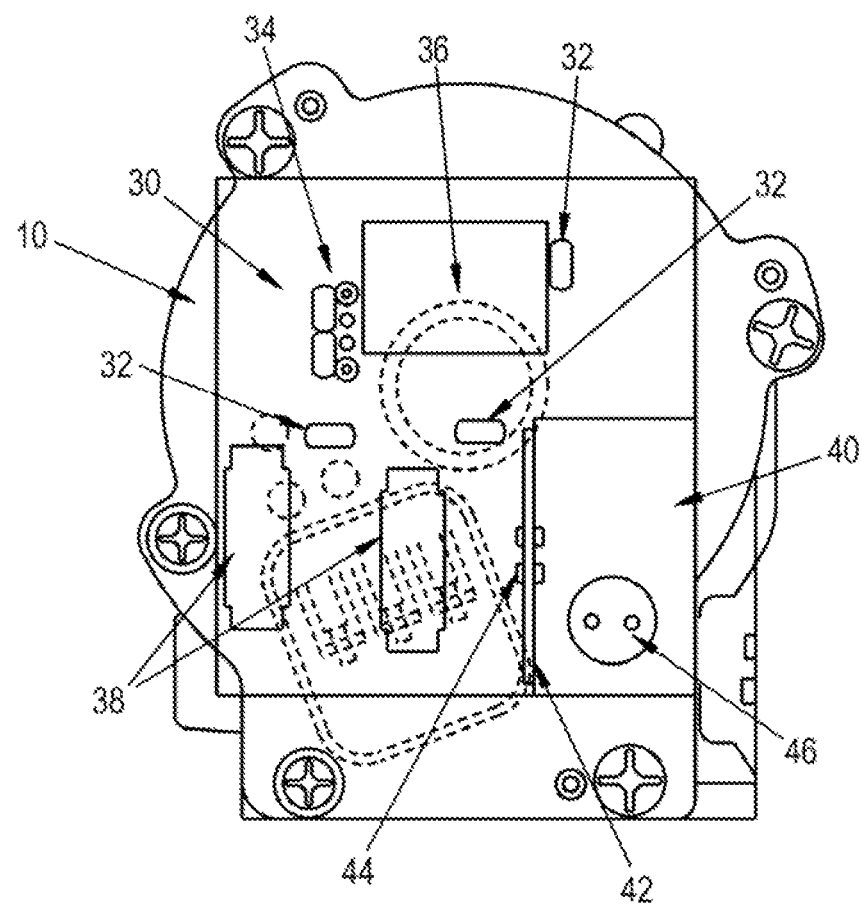
FIG. 7 represents the printed circuit board of FIG. 5 as installed on the exterior portion of the gear housing plate of FIG. 6 in accordance with an aspect of the invention.
Figure 8:
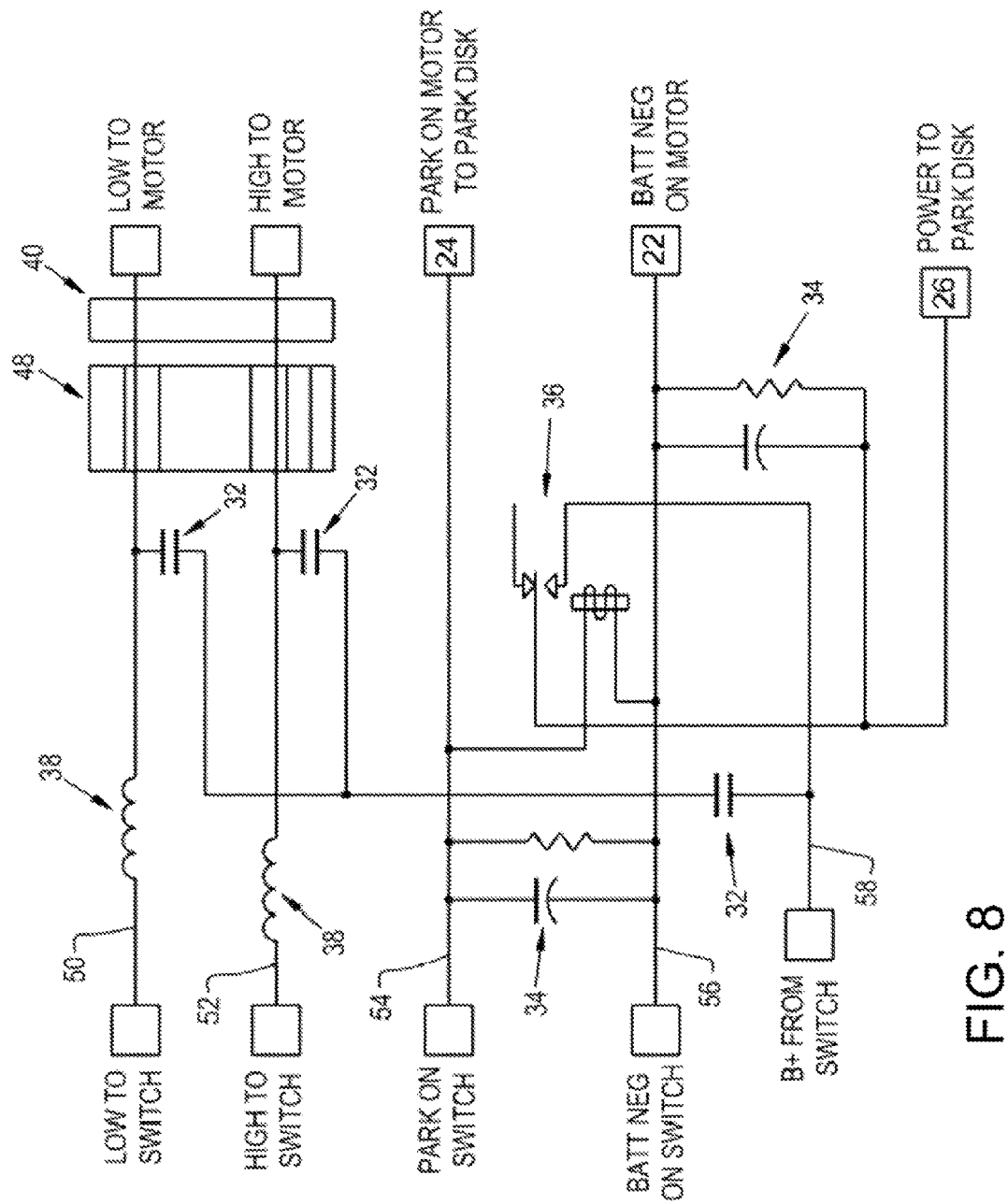
FIGS. 8 and 9 are wiring diagrams representing circuits suitable for suppressing the EMI of an electric motor in accordance with aspects of the invention.

FIG. 5 represents a system including a printed circuit board 30 having components thereon suitable for suppressing electromagnetic emissions produced from an electric motor, such as the motor 10 of FIG. 1, in accordance with an aspect of the invention. FIG. 6 represents an exterior portion of the gear housing plate 20 of FIG. 2, which as previously discussed is adapted for assembly with the +24 volt DC electric motor 10 of FIG. 1. FIG. 7 represents the printed circuit board 30 of FIG. 5 installed on the exterior portion of the gear housing plate 20 of FIG. 6 in accordance with an aspect of the invention. The printed circuit board 30 has located thereon bypass capacitors 32, an RC filter 34 (comprising a resistor and capacitor in parallel), an isolation relay 36, inductors 38, a Faraday cage 40, an EMI filter PC board 42 including EMI filter caps 44, and at least one filter capacitor 46. The bypass capacitors 32, RC filter 34, isolation relay 36, and inductors 38 are preferably electrically connected according to the wiring diagram represented in FIG. 8. It should be understood that the components and wiring of the system disclosed in FIGS. 5 and 8 represent a single embodiment of the invention as directed towards the motor 10, and that other functionally equivalent components and wiring may be used for the motor 10 or other motors. For example, the number and size of the bypass capacitors 32 used in the system may vary depending on the specific motor to which the system is coupled or the application for which it is being used.

As previously stated, during operation of the motor 10 at least one pulse of conducted and radiated electromagnetic emissions may be produced with every complete rotation of the park disk 12. Such pulses may travel through wires that are exposed to an exterior of the motor 10 (for example, low and high input wires 50 and 52) that connect the motor switch ("SWITCH" in FIG. 8) to the motor 10, and may then radiate from the wires and potentially cause EMI. FIG. 8 represents the high input wire 52 and the low input wire 50 traveling from the motor 10 through the optional Faraday cage 40, through a ferrite bead 48, through the inductors 38, and on to the motor switch. Preferably, the system includes the Faraday cage 40, EMI filter PC board 42, EMI filter caps 44, and filter capacitor 46. If included, the high input wire 52 and the low input wire 50 first travel into the Faraday cage 40 that houses the filter capacitors 46 and through the capacitors 46. The Faraday cage 40, capacitors 46, and any other components within the cage 40 act to suppress electromagnetic emissions traveling on the high and low input wires 52 and 50 during operation of the motor 10. The high and low input wires 52 and 50 may then travel out of the Faraday cage 40 and through the EMI filter PC board 42 having EMI filter caps 44 before continuing on to the ferrite bead 48 represented in FIG. 8. These components preferably capture, reduce, and/or eliminate emissions before they can conduct through and radiate from the wires 50 and 52.

Figure 3A:
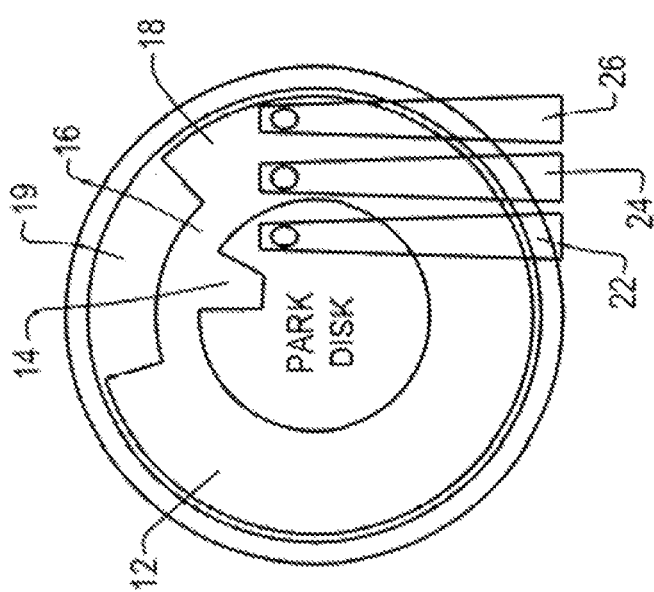
Figure 10:
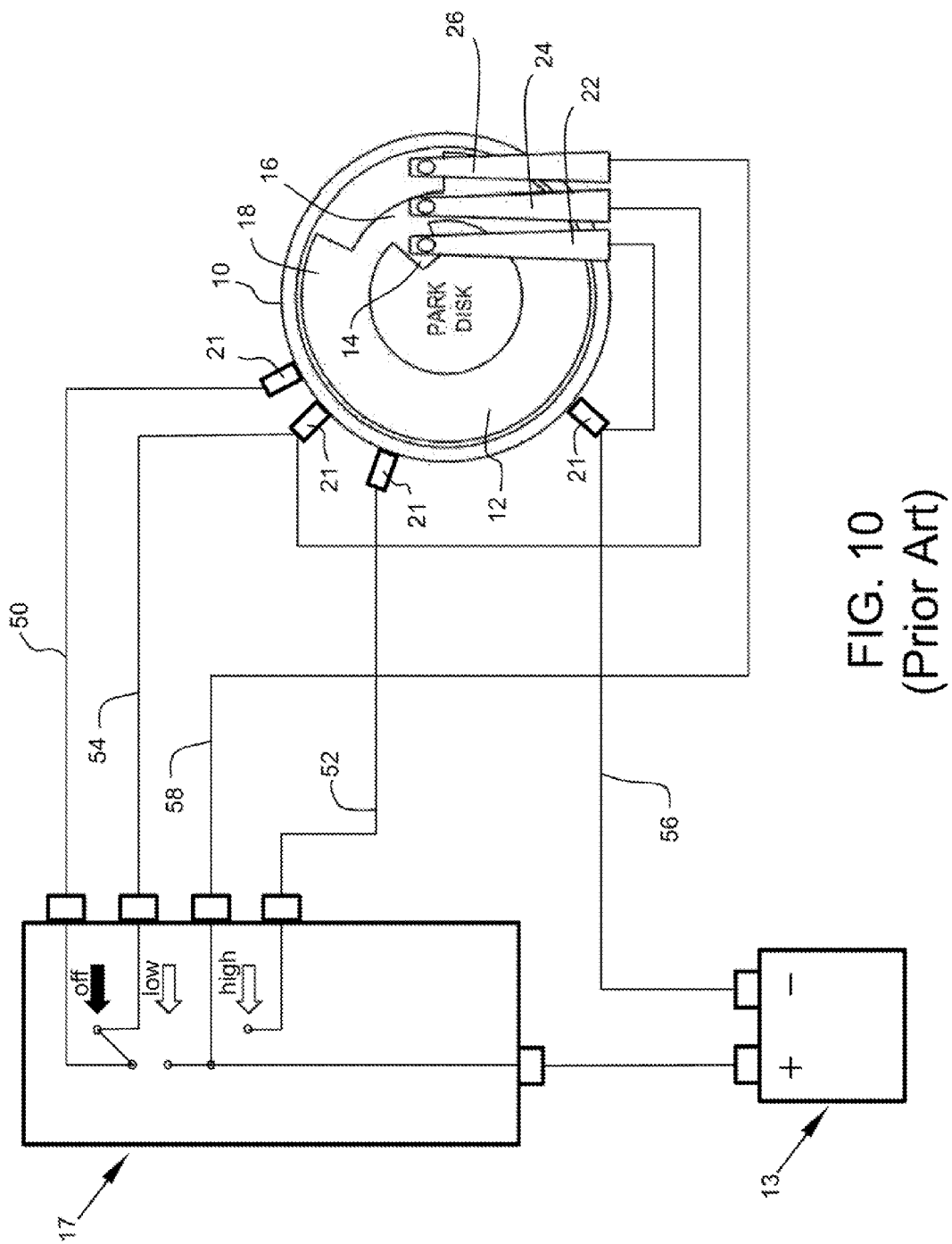
FIGS. 10 through 12 are exemplary wiring diagrams of a windshield wiper system comprising a windshield wiper motor of the types depicted in FIGS. 1 and 2.
Figure 11:
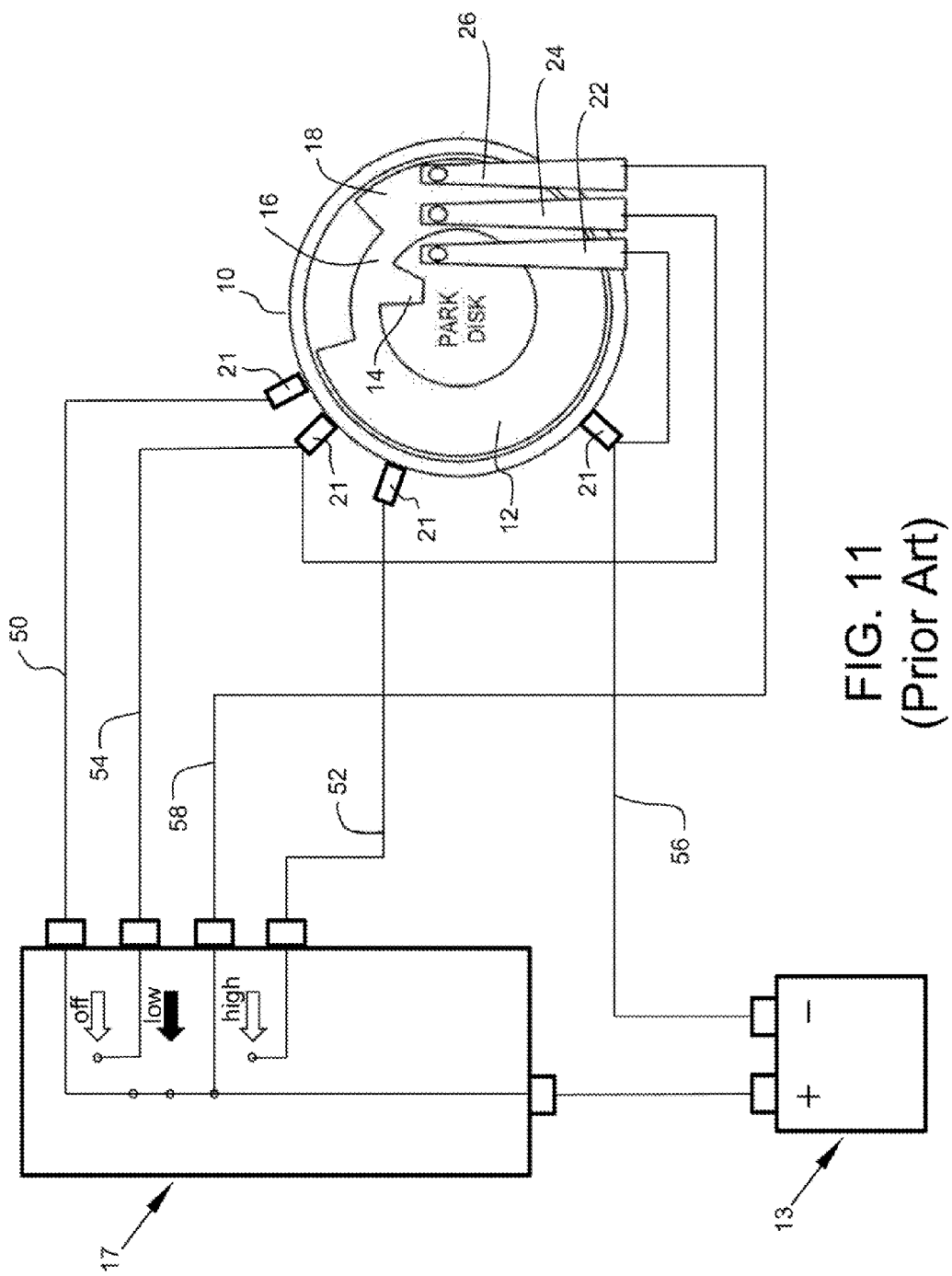
Figure 12:
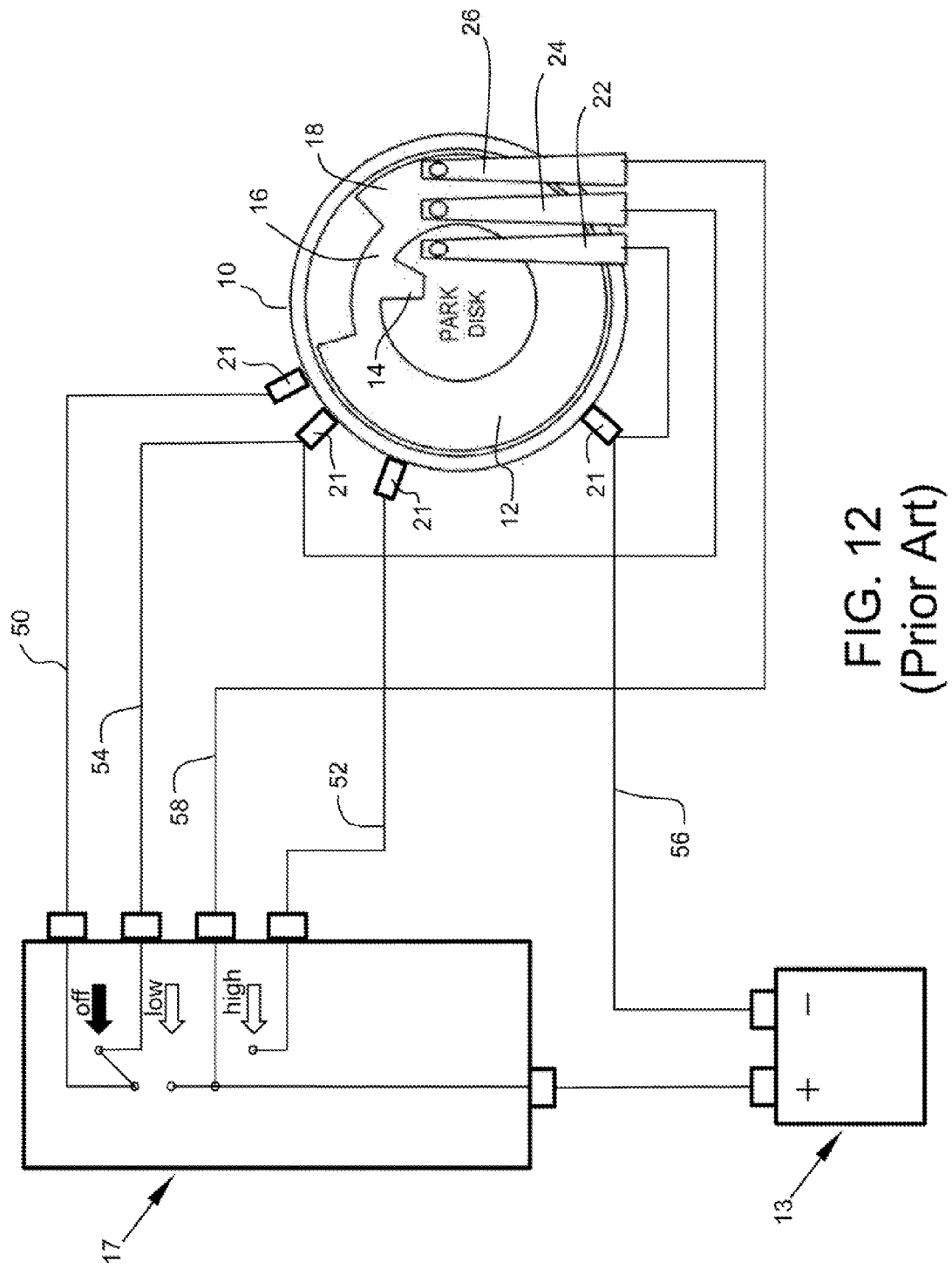
Figure 13:
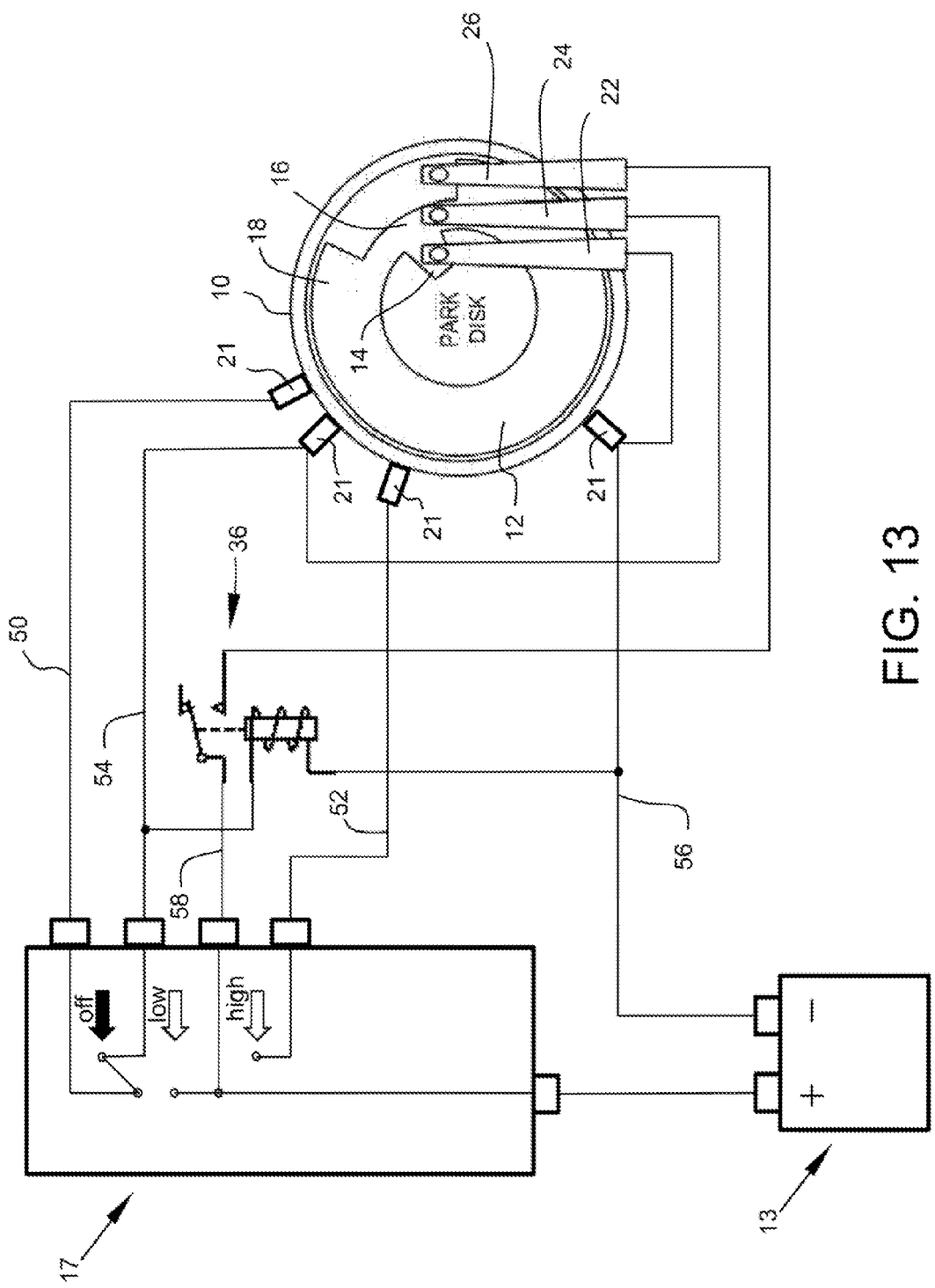
FIGS. 13 through 15 are wiring diagrams of a windshield wiper system in accordance with certain aspects of the present invention.

Conventionally, the park disk 12 would be connected to power at any point in its rotation when the battery positive contact 26 is electrically connected battery positive section 18 during operation of the motor 10, for example, when the park disk 12 is in the position depicted in FIG. 3A. According to an aspect of the present invention, in order to prevent electromagnetic emissions from occurring and subsequently traveling through wires exposed to the exterior of the motor 10 while the motor 10 is operating, the park disk 12 is entirely electrically isolated from the power (battery positive wire 58) during operation of the motor 10 in high and low speed modes with the isolation relay 36, which may be, for example, an electromechanical relay or an equivalent thereof. The isolation relay 36 is configured to be normally open during operation of the motor 10 in high and low speed modes thereby electrically isolating the park disk 12 from power. Since the park disk 12 is isolated from power during operation in high and low speed modes, park disk 12 will not repeatedly transition from +24 volts to ground (0 volts) and then back to +24 volts as it otherwise would with every rotation if power was connected, and therefore electromagnetic pulses will not occur. When the motor switch is moved to the park position ('off'), the isolation relay 36 is energized, providing power to the park disk 12 allowing the motor to operate in park mode and dynamically park. FIG. 13 is a wiring diagram representing a nonlimiting system and method of wiring the park disk 12, the switch 17, and the battery 13 in accordance with certain aspects of the invention. FIG. 13 is similar to the wiring diagram of FIG. 10; however, the isolation relay 36 has been located on the battery positive wire 58 to electrically isolate the park disk 12 from the positive terminal of the battery 13 during operation of the motor 12 in a running mode (e.g., high or low). In FIG. 13, the switch 17 is set to the park position ('off') thereby electrically connecting the park wire 54 to the low input wire 50. The motor 10 is represented as being turned off and the park disk 12 is located in the park position.

Figure 3B:
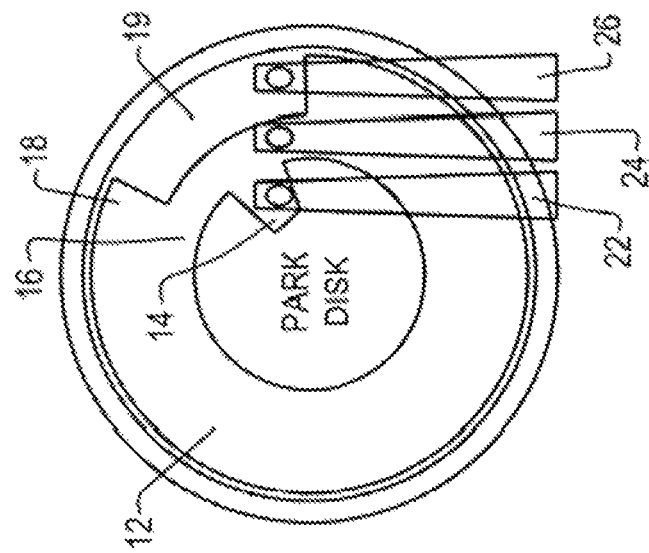
Figure 14:
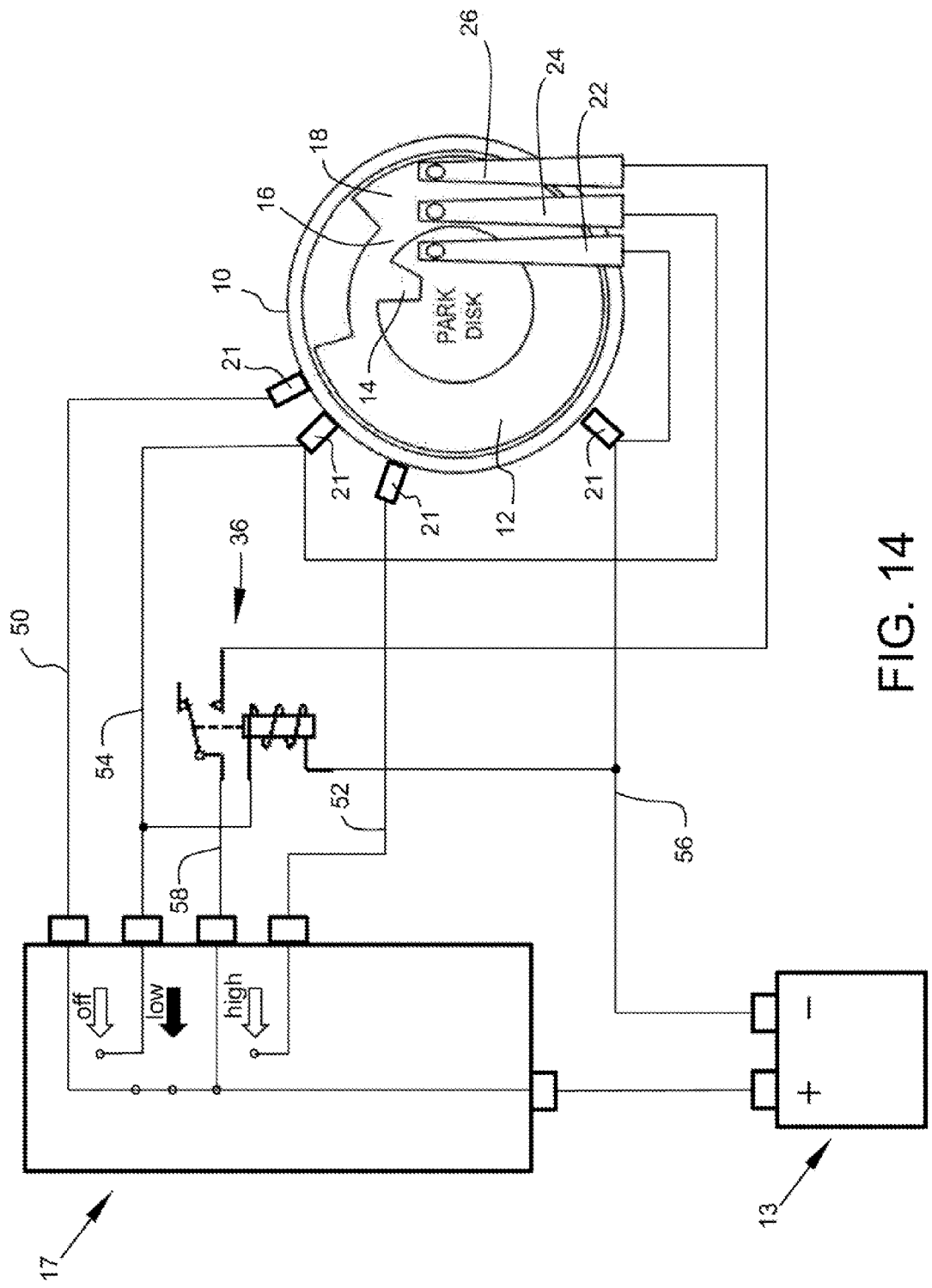

In view of the above, the motor 10 functionally coupled to the system operates as follows. When the motor 10 is off and the motor switch is set to the park position ('off'), the park disk 12 is in the dynamic park position, that is, the ground contact 22 is in contact with the ground tab 14 of the park disk 12 (for example, as represented in FIG. 3B). When the motor switch is set to either the low or high position ('low' or 'high'), the motor 10 begins running in low or high speed mode, respectively. While the motor 10 is running in low speed mode, the high input wire is open. Conversely, when the motor 10 is running in high speed mode, the low input wire is open. Regardless, when operating in either low or high speed modes, electrical current flows between the switch 17 and the motor 10 through the corresponding high or low input wire 52 or 50. For example, FIG. 14 represents the system of FIG. 13 when the switch is set to the low position ('low') thereby electrically connecting the positive terminal of the battery 13 to the low input wire 50, and the motor 10 is operating in low speed mode. As represented, current flows from a positive terminal on the battery 13 to the switch 17, through the switch 17 to the low input wire 50, through the low input wire 50 to the motor 10 (via contact 21), through the motor 10 to the battery negative wire 56 (via contact 21), and through the battery negative wire 56 to the negative terminal on the battery 13 (or ground). During this time, the high input wire 52 and the park wire 54 are open at the switch, and the isolation relay 36 is open. The park disk 12 is represented as being in an exemplary transient operating position. It should be understood that the system operates in substantially the same manner when in high speed mode rather than low speed mode. When the switch 17 is set to the high position ('high'), the high input wire 52 is connected to the positive terminal of the battery 13, and the low input wire 50 and park wire 54 remain open.

Figure 15:
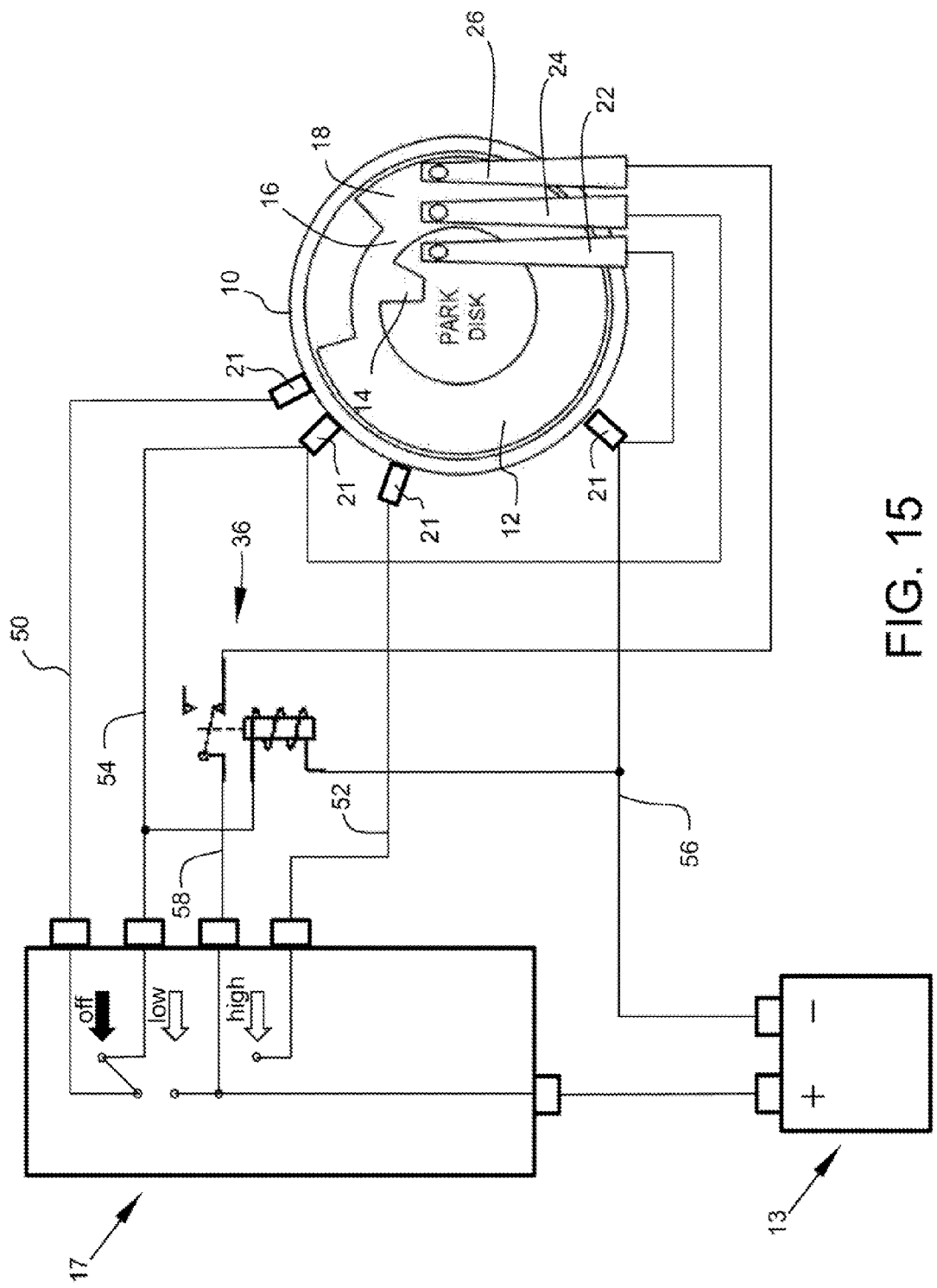

When the motor switch 17 is set back to the park position ('off') from either the high position ('high') or the low position ('low'), the high input wire 52 is open and the low input wire 50 is electrically connected to the park wire 54 on the motor switch. At this point, the isolation relay 36 is energized and thereby connects the battery positive wire 58 to the park disk 12 through the common and normally open contacts of the isolation relay 36, causing the motor 10 to continue to operate in park mode at low speed. For example, FIG. 15 represents the system of FIG. 13 when the switch 17 is set from the low position ('low') to the park position ('off') thereby electrically connecting the positive terminal of the battery 13 to the low input wire 50, and the motor 10 is operating in park mode. The isolation relay 36 is energized, closes, and connects the battery positive wire 58 to the park disk 12. Since the park disk 12 is depicted as being in a transient operating position, the motor 10 continues to operate at low speed until the park disk 12 rotates to the park position. While operating in park mode, current flows from the positive terminal on the battery 13 to the switch 17, through the switch 17 to the battery positive wire 58, through the battery positive wire 58 to the park disk 12 (via the battery positive contact 26), through the park disk 12 to the park wire 54 (via the park contact 24), through the park wire 54 to the switch 17, through the switch 17 to the low input wire 50, through the low input wire 50 to the motor 10 (via contact 21), through the motor 10 to the battery negative wire 56 (via contact 21), and through the battery negative wire 56 to the negative terminal on the battery 13 (or ground). Once the park disk 12 rotates to the park position, the circuit represented in FIG. 15 is opened (battery positive contact 26 is over the opening 19) and the isolation relay 36 is de-energized, thereby removing power from the park disk 12 and causing the motor 10 to cease operation.

Figure 16:
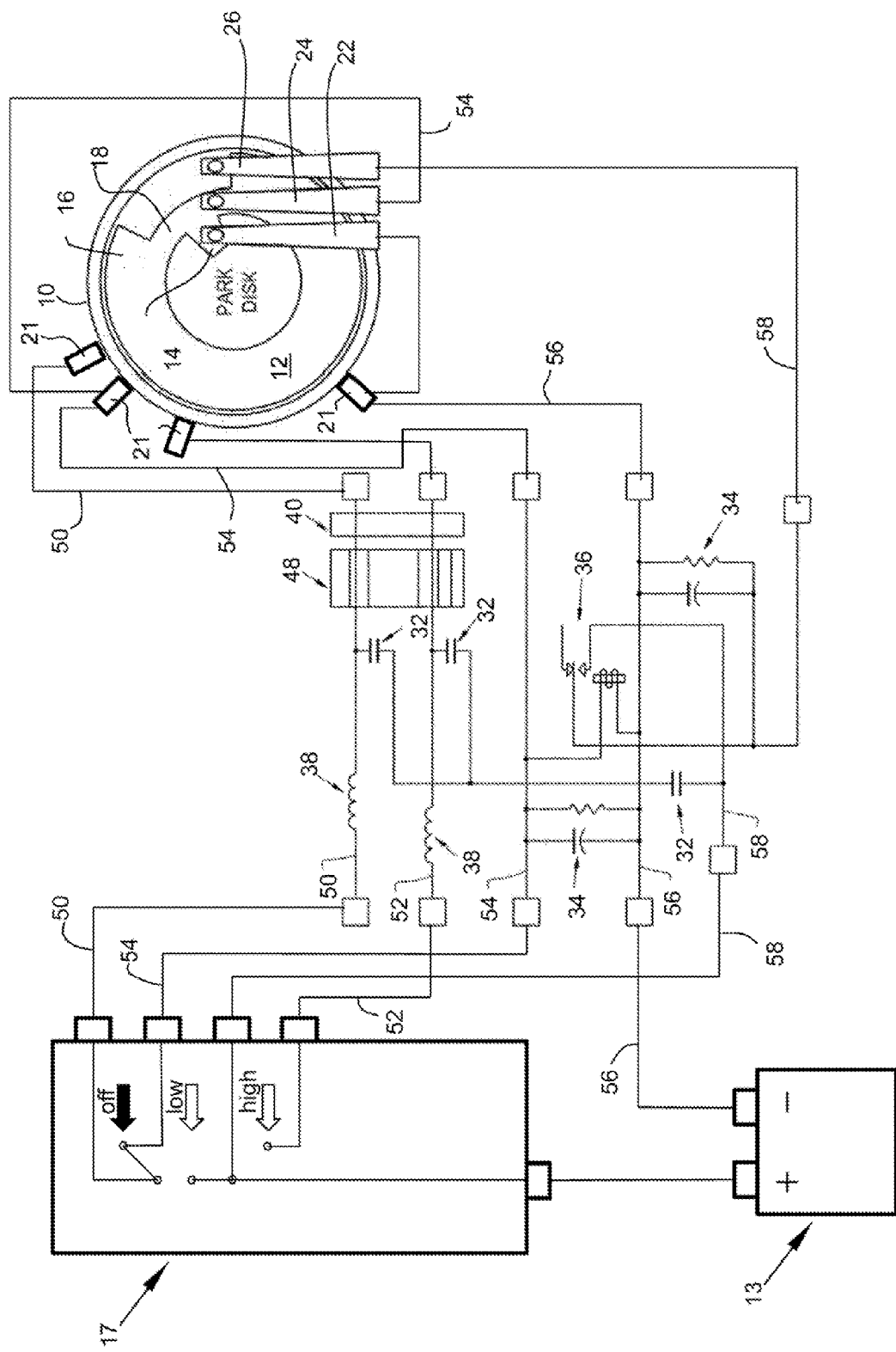
FIG. 16 is a wiring diagram of a windshield wiper system comprising the circuit of FIG. 8.

FIG. 16 is a wiring diagram representing another nonlimiting system and method of wiring the park disk 12, the switch 17, and the battery 13 in accordance with certain aspects of the invention, and includes the circuit represented in FIG. 8. Despite having additional components for emission reduction, the isolation relay 36 is still located on the battery positive wire 58 to electrically isolate the park disk 12 from the positive terminal of the battery 13 during operation of the motor 12 in a running mode. As such, the system of FIG. 16 operates in substantially the same manner as the system of FIGS. 13 through 15 in regards to the dynamic parking function and therefore will not be discussed further herein. In FIG. 16, the switch 17 is set to the park position ('off') thereby electrically connecting the park wire 54 to the low input wire 50. The motor 10 is represented as being turned off and the park disk 12 is located in the park position.

Figure 9:
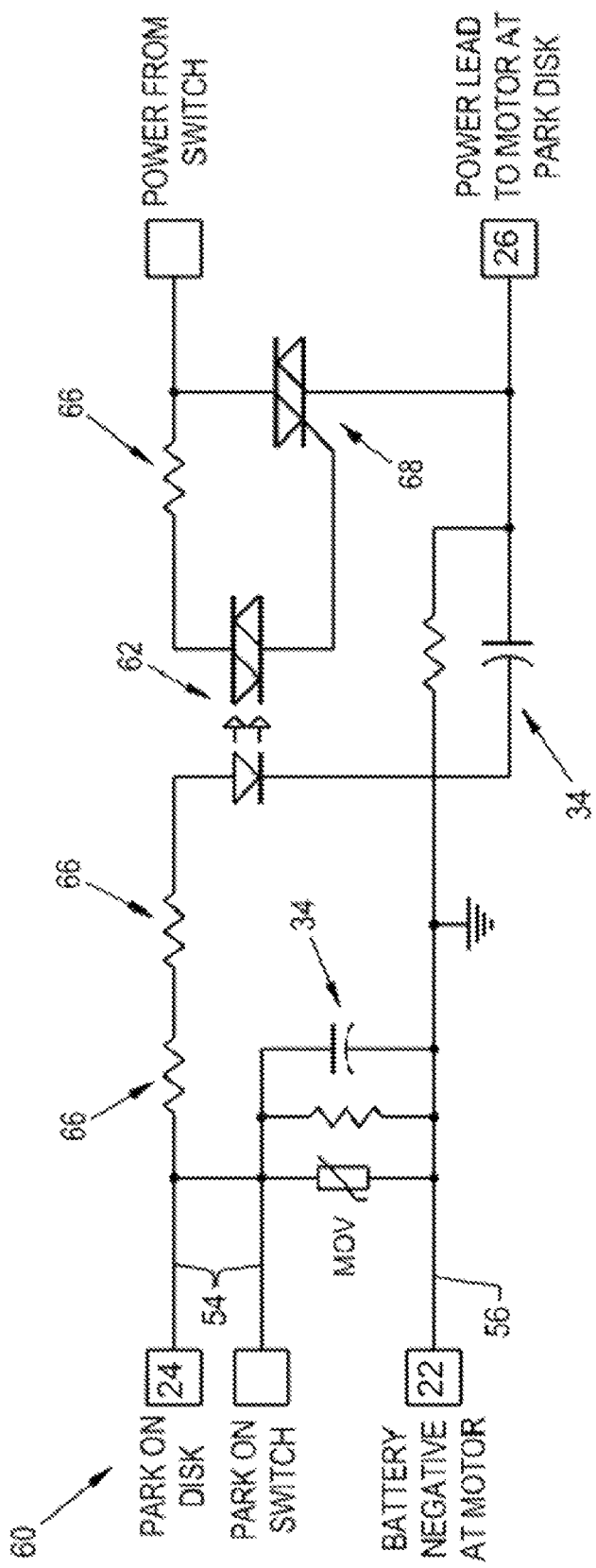

According to another aspect of the invention, the isolation relay 36 of FIGS. 8 through 16 may be replaced with a solid-state relay (switch) 60, for example, as represented in a wiring diagram of FIG. 9. The solid-state relay 60 is represented as an optocoupled solid-state relay comprising an optocoupler (opto-isolated triac) 62. FIG. 9 shows RC filters 34 that correspond to the RC filters 34 of FIGS. 5, 7 and 8, and therefore each comprise a resistor and capacitor in parallel with each other. It may be beneficial to also include a metal oxide varistor (MOV) as a surge protector as represented in FIG. 9. FIG. 9 further shows current limiting resistors 66 that limit a trigger current at the output of the optocoupler 62 and gate (TRIAC) 68 of the solid-state relay 60. When the motor 10 is operating in either low or high speed mode, only a nominal current, for example, less than five milliamperes, will be flowing through the resistors in the RC filters 34. During this time, there is no current flow through the rest of the solid-state relay 60.

When the switch 17 is set from either the high or low position to the park position ('off'), the park wire 54 is electrically connected to the low input wire 50 at the switch 17. This provides power to the input of the optocoupler 62, coupling the TRIAC output of the optocoupler 62 (signal driver) and turning the solid-state relay 60 on. Electrical current then flows from power at the switch 17 through the battery positive wire 58 to the park disk 12 of the motor 10. During this time, there is a nominal current, for example, less than five milliamperes, flowing in the resistors in the RC filters 34, and there is no current flow through the rest of the solid-state relay 60.

Windshield wiper systems as described herein produce significantly reduced levels of electromagnetic emissions relative to dynamic parking motors which have power connected to the park disk 12 during operation. Investigation leading to the present invention determined that by electrically isolating park disk 12 from the power during operation of the motor 10 in running modes (e.g., high and low speed modes), emissions of the motor 10 can be near or below industry standards, such as the U.S. military standard MIL-STD-461F. Notably, windshield wiper systems that are wired in the manner represented in FIGS. 13 through 16 will continue to produce an electromagnetic pulse when the motor 10 dynamically parks, that is, when the isolation relay 36 is energized and the power is connected to the park disk 12 and then subsequently disconnected when the park disk 12 reaches to the park position. However, in the example of military vehicle safety, it is believed that this would still reduce the likelihood of a military vehicle being tracked by the EMI generated by the motor 10. In particular, the emission could only be detected as a single pulse rather than a repeating signal and therefore only provide a momentary location without indicating a direction of the vehicle.

While the invention has been described in terms of specific embodiments, it is apparent that other forms could be adopted by one skilled in the art. For example, the physical location of the components on the printed circuit board 30 could differ from that shown, functionally equivalent components other than those noted could be used, and the number and size of components used could differ. Therefore, the scope of the invention is to be limited only by the following claims.

The invention claimed is:

1. An electrical motor operable in at least one running mode wherein the electrical motor operates at a constant speed and operable in a park mode wherein the electrical motor dynamically parks, the electrical motor comprising:
   a housing;
   a rotating park disk within the housing and configured to cause the electrical motor to dynamically park;
   a park wire electrically coupling the park disk to a motor switch, the motor switch configured to selectively switch the electrical motor between the at least one running mode and the park mode, the park wire exiting the housing and being exposed at an exterior of the housing; and
   a power wire electrically coupling the park disk to a power source, the power wire exiting the housing and being exposed at the exterior of the housing;
   wherein the park disk is entirely electrically isolated from the power source during operation of the electrical motor in the at least one running mode and the park wire is electrically connected to the power source through the park disk and the power wire during operation of the electrical motor in the park mode, the park wire providing power to the electrical motor in the park mode such that the electrical motor dynamically parks.

2. The electrical motor of claim 1, wherein the park disk is electrically isolated from the power source during operation of the electrical motor in the at least one running mode with a relay located on the power wire that is normally open.

3. The electrical motor of claim 2, wherein the relay is an electromechanical relay.

4. The electrical motor of claim 2, wherein the relay is a solid-state relay.

5. The electrical motor of claim 1, further comprising at least one running mode wire electrically coupling the electrical motor to the motor switch, the at least one running mode wire traveling from the electrical motor to the motor switch through a ferrite bead and through at least one inductor.

6. The electrical motor of claim 1, further comprising at least one running mode wire electrically coupling the electrical motor to the motor switch, the at least one running mode wire being electrically coupled to the power wire with at least one filter capacitor.

7. The electrical motor of claim 1, further comprising at least one running mode wire electrically coupling the electrical motor to the motor switch and a Faraday cage through which the at least one running mode wire travels after exiting the exterior of the housing.

8. The electrical motor of claim 7, further comprising at least one filter capacitor within the Faraday cage, the at least one running mode wire running through the at least one filter capacitor.

9. The electrical motor of claim 8, further comprising an EMI filter PC board having EMI filter caps thereon through which the at least one running mode wire travels after exiting the Faraday cage.

10. The electrical motor of claim 1, further comprising a ground wire electrically coupling the park disk to ground, the ground wire exiting the housing and being exposed at the exterior of the housing, the park wire and the power wire being electrically coupled to the ground wire with RC filters.

11. An electrical motor operable in at least one running mode wherein the electrical motor operates at a constant speed and operable in a park mode wherein the electrical motor dynamically parks, the electrical motor comprising:
   a housing;
   a rotating park disk within the housing and functionally coupled to a ground contact, a park contact, and a battery positive contact, the park disk configured to allow the electrical motor to dynamically park by operating the electrical motor in the at least one running mode until the park disk rotates to a park position such that the park disk is electrically coupled to the ground contact and the park contact and not electrically coupled to the battery positive contact;
   a park wire electrically coupling the park contact to a motor switch, the motor switch configured to selectively switch the electrical motor between the at least one running mode and the park mode, the park wire exiting the housing and being exposed at an exterior of the housing; and
   a battery positive wire electrically coupling the battery positive contact to a positive terminal on a battery, the battery positive wire exiting the housing and being exposed at the exterior of the housing,
   wherein the park disk is entirely electrically isolated from the power source during operation of the electrical motor in the at least one running mode and the park wire is electrically connected to the power source through the park disk and the battery positive wire during operation of the electrical motor in the park mode until the park disk rotates to a park position, the park wire providing power to the electrical motor in the park mode such that the electrical motor dynamically parks.

12. A method of operating an electrical motor operable in at least one running mode wherein the electrical motor operates at a constant speed and operable in a park mode wherein the electrical motor dynamically parks, the electrical motor comprising a housing with a rotating park disk therein configured to cause the electrical motor to dynamically park, a park wire electrically coupling the park disk to a motor switch configured to selectively switch the electrical motor between the at least one running mode and the park mode, the park wire exiting the housing and being exposed at an exterior of the housing, a power wire electrically coupling the park disk to a power source, the power wire exiting the housing and being exposed at the exterior of a housing, the method comprising:

entirely electrically isolating the park disk from the power source during operation of the electrical motor in the at least one running mode; and electrically connecting the park wire through the park disk to the power source and the power wire during operation of the electrical motor in the park mode.

13. The method of claim 12, wherein electrically isolating the park disk from the power source includes providing a relay that is normally open on the power wire between the park disk and the power source.

14. The method of claim 13, wherein the relay is an electromechanical relay.

15. The method of claim 14, wherein electrically connecting the park wire to the power wire includes energizing the electromechanical relay.

16. The method of claim 13, wherein the relay is a solid-state relay.

17. The method of claim 12, further comprising providing a ferrite bead and at least one inductor on at least one running mode wire between the electrical motor and the motor switch, the at least one running mode wire electrically coupling the electrical motor to the motor switch.

18. The method of claim 12, further comprising electrically coupling at least one running mode wire to the power wire with at least one filter capacitor, the at least one running mode wire electrically coupling the electrical motor to the motor switch.

19. The method of claim 12, further comprising electrically coupling the park wire and the power wire to a ground wire with RC filters, the ground wire electrically coupling the park disk to ground and exiting the housing and being exposed to the exterior of the housing.

20. The method of claim 12, further comprising providing a Faraday cage through which at least one running mode wire travels after exiting the exterior of the housing, the at least one running mode wire electrically coupling the electrical motor to the motor switch.

21. The method of claim 20, further comprising providing at least one filter capacitor within the Faraday cage with the at least one running mode wire running through the at least one filter capacitor and providing an EMI filter PC board having EMI filter caps thereon through which the at least one running mode wire travels after exiting the Faraday cage.

* * * * *